C. D. CORLISS.
GREASE CUP.
APPLICATION FILED JUNE 20, 1918.
1,347,472.
Patented July 20, 1920.
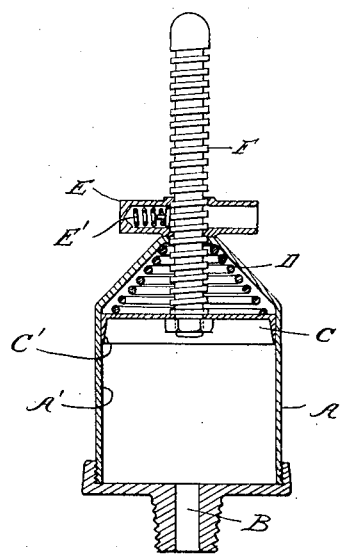
Inventor
Cullen D. Corliss
By Whittemore Hulbert & Whittemore
Attorneys

UNITED STATES PATENT OFFICE.

CULLEN D. CORLISS, OF DETROIT, MICHIGAN, ASSIGNOR TO MICHIGAN LUBRICATOR COMPANY, OF DETROIT, MICHIGAN, A CORPORATION OF MICHIGAN.

GREASE-CUP.

1,347,472.          Specification of Letters Patent.          Patented July 20, 1920.

Application filed June 20, 1918. Serial No. 240,914.

*To all whom it may concern:*

Be it known that I, CULLEN D. CORLISS, a citizen of the United States of America, residing at Detroit, in the county of Wayne and State of Michigan, have invented certain new and useful Improvements in Grease-Cups, of which the following is a specification, reference being had therein to the accompanying drawings.

The invention relates to grease cups and one of the objects of the invention is to obtain a construction which will prevent the leakage of grease between the plunger and the cup containing the grease. Other objects of the invention reside in the novel arrangements and combinations of parts as more fully hereinafter set forth.

In the drawings:

The figure is a sectional view through the grease cup.

A is the cup for the grease, provided with the axially arranged bore B in its base for the passage of the grease therefrom and C is the plunger longitudinally slidably engaging the inner wall A' of the cup. D is a conical coil spring between the upper end of the cup A and the plunger C adapted to normally force the plunger inward relative to the cup A, this inward movement being adjustably limited by the nut E threadedly engaging the stem F, which axially extends into the cup A and is secured to the plunger C. The spring E' within the nut E frictionally resists the relative turning of the nut and stem.

For the purpose of preventing the leakage of the grease between the plunger C and the inner wall A' of the cup, the plunger is formed of resilient metal and preferably by stamping the same, and has the inwardly extending peripheral knife-edge flange C' adapted to slidably engage the inner wall A'. This plunger has a normal outer diameter slightly greater than the inner diameter of the cup A so that when the plunger is assembled within the cup A, the plunger is contracted, which is possible due to the cup shape of the plunger, the knife-edge flange and the resiliency of the material, and is under lateral compression so that the knife-edge flange forms a tight sealing fit with the inner wall A' at all times.

From the above description it is readily seen that a tight sealing engagement is secured between the peripheral flanges of the plungers and the inner walls of the cups so that the grease can not escape therebetween, due to the fact that the plungers are sprung into the cups and are under lateral compression at all times when in the cups.

What I claim as my invention is:

1. In a grease cup, the combination with the cup for the grease, of a resilient metal plunger relatively movable longitudinally thereof, said plunger provided with an integral peripheral knife-edge flange slidably engaging the inner wall of said cup, said flange having a normal outer diameter greater than the inner diameter of said cup.

2. In a grease cup, the combination with the cup for the grease, of a relatively movable resilient metal plunger stamped out of sheet metal and having an integral peripheral knife-edge flange slidably engaging the inner wall of said cup.

In testimony whereof I affix my signature.

CULLEN D. CORLISS.